(12) United States Patent
Joseph

(10) Patent No.: US 12,578,974 B2
(45) Date of Patent: Mar. 17, 2026

(54) OPEN SYSTEMS ARCHITECTURE FOR VEHICLE SYSTEMS

(71) Applicant: Roush Industries, Inc., Livonia, MI (US)

(72) Inventor: Geoffrey Joseph, Lambertville, MI (US)

(73) Assignee: Roush Industries, Inc., Livonia, MI (US)

( * ) Notice: Subject to any disclaimer, the term of this patent is extended or adjusted under 35 U.S.C. 154(b) by 93 days.

(21) Appl. No.: 18/615,318

(22) Filed: Mar. 25, 2024

(65) Prior Publication Data

US 2024/0330014 A1 Oct. 3, 2024

Related U.S. Application Data

(60) Provisional application No. 63/455,294, filed on Mar. 29, 2023.

(51) Int. Cl.
*G06F 9/445* (2018.01)
*G07C 5/12* (2006.01)

(52) U.S. Cl.
CPC ........... *G06F 9/44505* (2013.01); *G07C 5/12* (2013.01)

(58) Field of Classification Search
CPC ................................ G06F 9/4405; G07C 5/12
See application file for complete search history.

(56) References Cited

U.S. PATENT DOCUMENTS

| | | | |
|---|---|---|---|
| 8,150,988 B2 | 4/2012 | Pardo-Castellote et al. | |
| 8,671,135 B1 | 3/2014 | Joshi et al. | |
| 10,812,593 B2 | 10/2020 | Haidar et al. | |
| 2019/0251050 A1 | 8/2019 | Rajabian-Schwart et al. | |
| 2019/0344663 A1 | 11/2019 | Ricci | |
| 2020/0294401 A1* | 9/2020 | Kerecsen | G08G 1/205 |
| 2024/0380816 A1* | 11/2024 | Miled | G06F 15/17312 |

* cited by examiner

*Primary Examiner* — Suraj M Joshi
(74) *Attorney, Agent, or Firm* — WARNER NORCROSS + JUDD LLP

(57) ABSTRACT

An improved open systems architecture for vehicle systems is provided. The open systems architecture allows for the rapid integration of new connected devices to an existing vehicle network, enabling real-time data exchanges among connected devices and potentially enhancing mobility, situational awareness, survivability, and lethality. The open systems architecture provides low latency communications for connected devices, is input/output (I/O) agnostic, and includes low system usage for message distribution. While uniquely suited for ground based systems, for example tracked and wheeled vehicles, the open systems architecture of the present invention can be configured for use with a wide range of crewed and autonomous vehicles, both military and non-military, including airborne platforms and maritime (surface and sub-surface) platforms.

18 Claims, 3 Drawing Sheets

OPEN SYSTEMS ARCHITECTURE FOR VEHICLE SYSTEMS

CROSS-REFERENCE TO RELATED APPLICATIONS

The present application claims priority to U.S. Provisional Application 63/455,294, filed Mar. 29, 2023, the disclosure of which is incorporated by reference in its entirety.

FIELD OF THE INVENTION

The present invention relates to open systems architectures, and in particular, open systems architectures for vehicle systems.

BACKGROUND OF THE INVENTION

An open systems architecture (OSA) is a design philosophy that aims to create systems with a high level of interoperability and modularity. As OSA generally includes standards, interfaces, and protocols that define how different components can be integrated into a larger system. One benefit of an OSA is the ability to develop a modular architecture, where different components can be readily swapped in and out without requiring major changes to the larger system. This allows for greater flexibility in the design and development of integrated systems, as well as making it easier to upgrade and maintain those systems over time. In the context of defense applications, an OSA approach is increasingly important, as it enables the rapid integration of different subsystems from multiple suppliers into a larger system.

Existing OSA standards for defense applications include Future Airborne Capability Environment (FACE) and Sensor Open Systems Architecture (SOSA). FACE is an OSA standard developed by the U.S. Department of Defense for avionics systems, while SOSA is an OSA standard that is also developed by the U.S. Department of Defense and that aims to provide a modular architecture for the integration and upgrade of system sensor components. However, there remains a continued need for an improved OSA that reduces costs and development time when integrating new or upgraded systems into existing vehicle platforms. In particular, there remains a continued need for an improved OSA that offers low latency message distribution among integrated systems practicing any number of different communications protocols.

SUMMARY OF THE INVENTION

An improved OSA for vehicle systems is provided. The improved OSA allows for the rapid integration of new connected devices to an existing vehicle network, enabling real-time data exchanges among connected devices and potentially enhancing mobility, situational awareness, and (in the case of military vehicles) survivability and lethality. The improved OSA provides low latency communications for connected devices, is input/output (I/O) agnostic, and includes low system usage for message distribution among relevant systems. While uniquely suited for ground based systems, for example tracked and wheeled vehicles, the OSA of the present invention can be configured for use with a wide range of crewed and autonomous vehicles, both military and non-military, including airborne platforms and maritime (surface and sub-surface) platforms.

In one embodiment, the OSA includes a services layer, a middleware layer, and a display layer. The services layer provides an Ethernet-based interface that can be used by any connected device that requires system access. In addition, the services layer translates among the different data formats and data structures and assigns a unique identifier to the output of each connected device. The middleware layer manages the flow of data and information from each connected device according to a publish-subscribe distribution model and applies a domain and a topic to each message from the various connected devices. The display layer manages the user interface(s) at the various crew stations, including the layout, formatting, and presentation of information. The display layer provides interoperability with a wide range of I/O devices and accepts control inputs from a wide range of I/O devices. The I/O devices can be connected to the display layer over an Ethernet connection, providing a standardized method for transmitting data between nodes over a vehicle network at high speeds with low latency and high reliability.

These and other features and advantages of the present invention will become apparent from the following description of the invention, when viewed in accordance with the accompanying drawings and appended claims.

Before embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

The current embodiment includes an open systems architecture (OSA) for military and commercial vehicles. The OSA of the present invention is configured to integrate sub-systems according to any data type and message structure and having essentially any system interface. As discussed below, the OSA of the present invention provides low latency communications for all safety critical systems, is input/output (I/O) agnostic, and includes low system usage for message distribution among relevant subsystems. While primarily described below in connection with ground-based systems, for example tracked and wheeled vehicles, the OSA of the present invention is uniquely suited for a wide range of crewed and autonomous vehicles, both military and non-military, including airborne platforms and maritime (surface and sub-surface) platforms.

Figure 1:
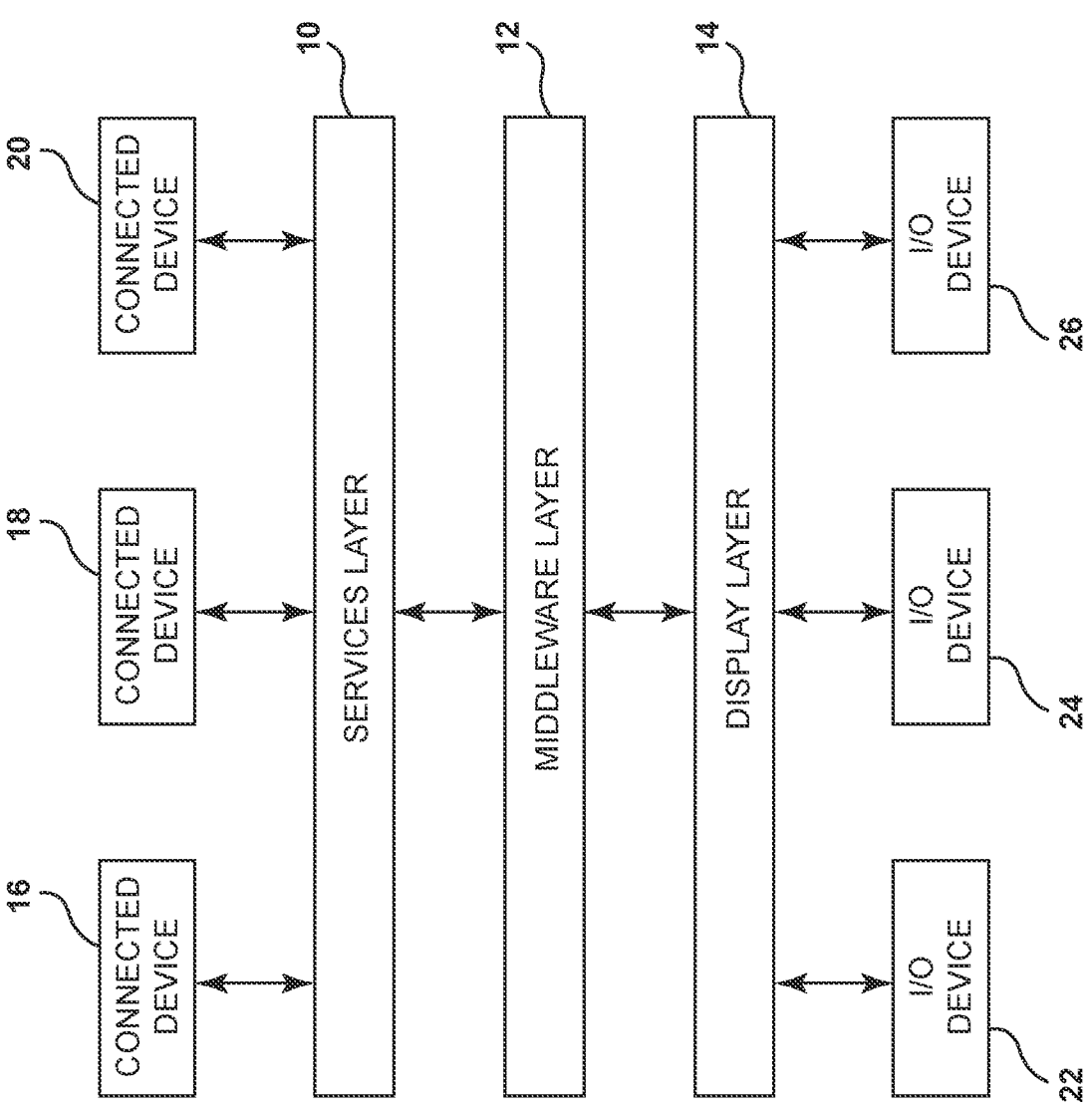
FIG. 1 is a block diagram illustrating an open systems architecture for a vehicle network including a services layer, a middleware layer, and a display layer.

Referring now to FIG. 1, the OSA of the present invention includes at least three layers: a services layer 10, a middleware layer 12, and a display layer 14. The services layer 10 abstracts the underlying hardware and software components, providing an Ethernet-based interface that can be used by any connected device that needs system access. Example services include security services, data management services, communication services, and configuration services.

In one example, multiple connected devices 16, 18, 20 are communicatively coupled to the services layer 10 over an Ethernet connection. The connected devices can include powertrain components, body module components, communications systems, I/O devices, sensor platforms, and weapons platforms, by non-limiting examples. The connected devices can be coupled directly to the services layer or can be connected via an intermediate device. For example, a VPX chassis (as a bridge to the services layer) can include multiple VPX modules that plug into corresponding backplane connectors and that are contained within a rugged and durable enclosure. The VPX chassis receives a data input and provides a data output that is based on the specific VPX modules that are installed in the chassis. The data output can include video or audio streams, network data, sensor data from connected devices, processed data signals, or digital signals, by non-limiting example.

The services layer 10 receives the data output(s) from each of the connected devices 16, 18, 20 directly or via an intermediate data bus. The services layer 10 includes multiple binders that provide a standard interface. The binders include middleware components that rapidly translate among the different interface standards and data formats used by the various connected devices, enabling system interoperability. The services layer 10 provides resource management, data storage and retrieval, network communication, security, and authentication. The services layer 10 is not limited to any one protocol. For example, the services layer 10 is simultaneously compatible with at least the following system interfaces: transmission control protocol (TCP), common industrial protocol (CIP), user datagram protocol (UDP), representational state transfer (REST) application programming interface (API), controller area network (CANBUS), universal serial bus (USB), simple direct media layer (SDL), and time-sensitive networking (TSN). In addition, the services layer 10 can accept any data type and message structure. With TSN, for example, the OSA provides low-latency communication for a variety of message types, making it suitable for precise timing and synchronization, while also avoiding network congestion. TSN also allows for the definition of different classes of services with varying priorities, such that time-critical traffic receives preferential treatment over less time-sensitive traffic.

The middleware layer 12 is a software layer that is responsible for managing the flow of data and information among the connected devices 16, 18, 20. More specifically, the middleware layer 12 is responsible for data routing according to a publish-subscribe distribution model. The publish-subscribe distribution model applies a domain and a topic to each message from the various connected devices. Merely by example, a tachometer (as the publisher) can provide a data output to the middleware layer. The middleware layer 12 then applies a domain (mobility) and a topic (engine speed) to the message (engine RPM) generated by the tachometer. The middleware layer 12 then publishes the message to those subscribers (other connected devices) that have subscribed to the underlying domain (mobility) and/or topic (engine speed). Further by example, a sensor that measures temperature or pressure can be a publisher, broadcasting its readings to other devices or systems that need to monitor or control the environment. Similarly, a camera or imaging system can be a publisher, broadcasting images or video data to other devices or systems that need to process or analyze visual information. In this distribution model, the publishers and the subscribers are decoupled, which allows for greater flexibility and scalability. The publishers are not required to know the identity or number of subscribers, and the subscribers are not required to know the identity or number of publishers. In this regard, the middleware layer 12 can add or remove publishers and subscribers without affecting the overall system architecture.

As noted above, the OSA of the present invention includes low system usage for message distribution among relevant subsystems. The OSA achieves low system usage by limiting publication of any given message to only subscribing connected devices and at an appropriate refresh rate, thereby lessening message traffic across the middleware layer 12. For example, if a given message is not being used by any connected devices, the middleware layer 12 prevents publication of that message unless and until a connected device subscribes to that message. Conversely, if a given message is being used by a single connected device, the middleware layer 12 ensures that the message is distributed (published) to only the subscribing connected device, rather than all connected devices that are coupled to the services layer 10. Further by example, if a connected device (e.g., a sensor) uses self-generated data locally, for which there are no other subscribing connected devices, the OSA prevents redistribution of that data through the middleware layer 12 to avoid unnecessary translation or conversion for the system backplane. In certain safety-critical messages, the middleware 12 can be programmed to periodically publish a given message to all connected devices, however this is by exception, such that the middleware layer 12 is not overwhelmed with message traffic for which there is no subscribing connected device. Lastly, the OSA assigns a particular refresh rate to each message according to usage criteria for each such message. The refresh rate is variable, such that the OSA can update (i.e., increase or decrease) the refresh rate for a particular message at any time, optionally in response to the addition (or removal) of subscribing connected devices to the OSA.

To reiterate, the middleware layer 12 receives and redistributes messages from the various connected devices, while the services layer 10 assigns a unique identifier to each publisher or subscriber at a given node of the vehicle network. The middleware layer 12 is not constrained to any particular message format, being readily configured to accept essentially any message format, whether now known or hereinafter developed. While the forgoing example referenced a mobility domain, essentially any domain is possible, including survivability, lethality, navigation, diagnostic/maintenance, and communications, by non-limiting example.

Lastly, the display layer 14 is responsible for managing the user interface(s) at the various crew stations, including the layout, formatting, and presentation of information. The display layer 14 provides interoperability with a wide range of I/O devices 22, 24, 26, including multi-function displays and touch screen displays, by non-limiting example. The display layer 14 also accepts control inputs from a wide range of I/O devices 22, 24, 26, including touchscreens, joysticks, keyboards, push-buttons, trigger switches, toggle switches, paddle switches, cameras, and microphones, by non-limiting example. Each I/O device 22, 24, 26 can also be connected to the services layer 10 as a publisher. Subscribing connected devices can use the published information for a wide range of purposes, such as monitoring, control, or decision-making. The I/O devices 22, 24, 26 can be connected to the display layer over an Ethernet connection, which provides a standardized method for transmitting data between nodes over the vehicle network at high speeds with low latency and high reliability.

Figure 2:
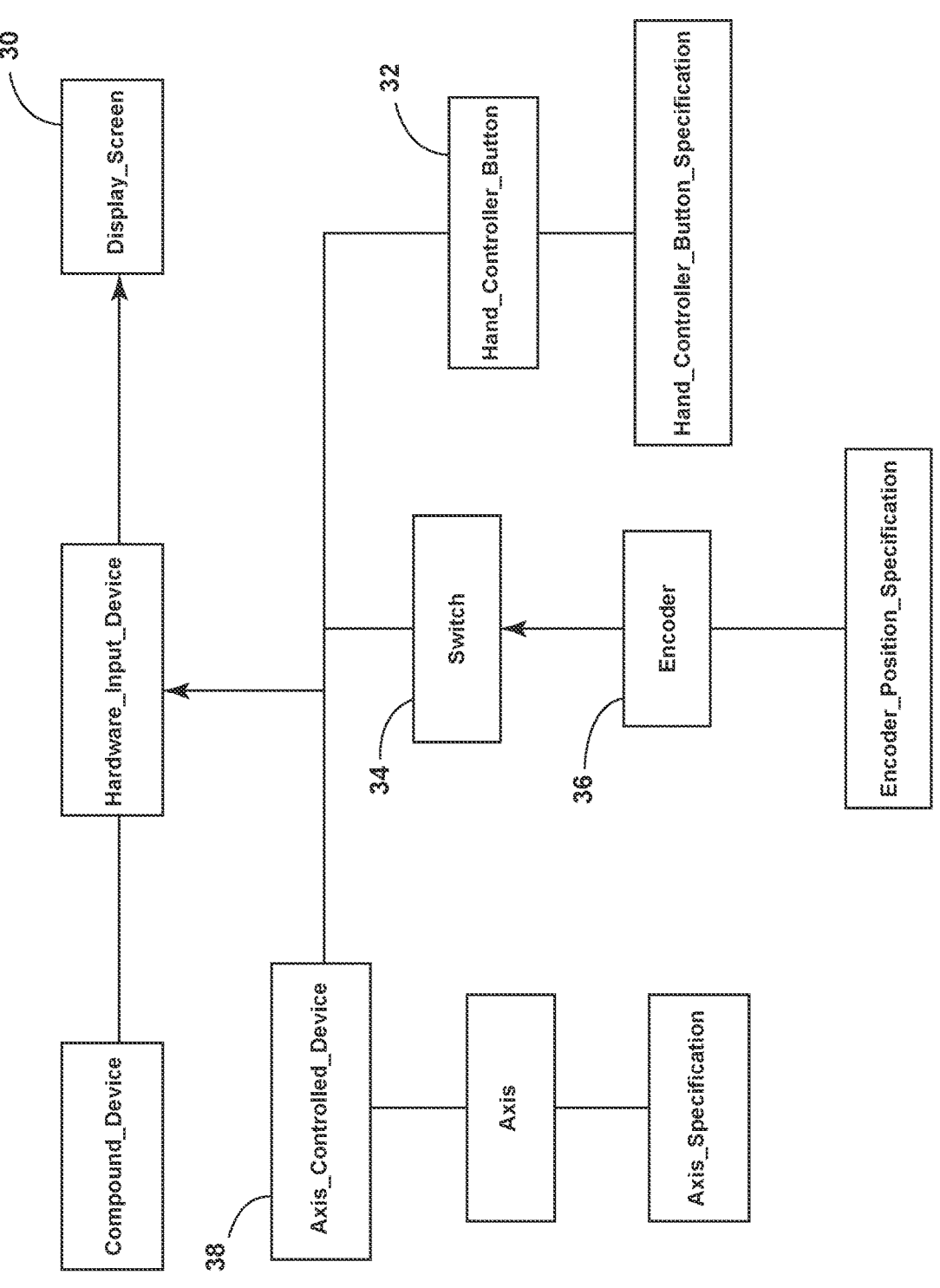
FIG. 2 is a block diagram illustrating a vehicle network having a display screen and a hand controller button for manipulation of a controlled device.

In a further example as shown in FIG. 2, the I/O devices includes a display screen 30 and a hand controller button 32. The hand controller button 32 is a hardware input device that actuates a switch 34, whose position is determined by an encoder 36. The switch 34 manipulates a controlled device 38, which is connected to a services layer and which publishes information on the display screen 30 in the manner as set forth above in connection with FIG. 1.

Figure 3:
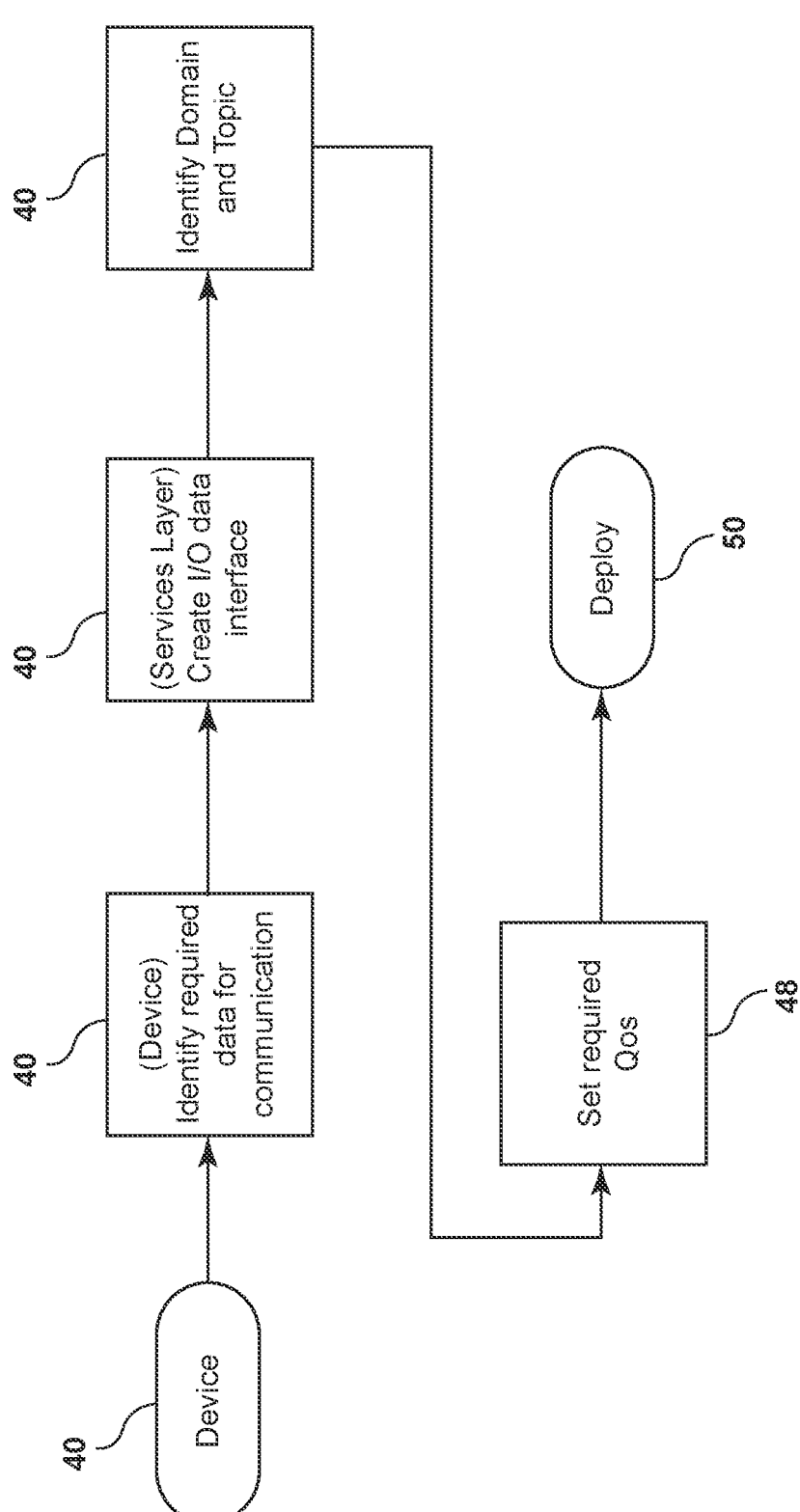
FIG. 3 is a flow-chart illustrating a method for adding a connected device to a vehicle network using the open systems architecture of FIG. 1.

In another aspect of the invention as illustrated in FIG. 3, a method is provided for integrating a connected device 40, in this example a sensor, to the vehicle network described above. The method includes identifying the sensor and its capabilities at step 42. This step can include identifying the sensor's output data format, communication protocol, and power demands. The method then includes selecting the appropriate physical interface (generally, a power connection and a network connection) to the vehicle's network at step 44. This step may involve selecting a standard protocol such as Ethernet, CAN bus, USB, or a proprietary interface. Once the connection method has been determined, the method includes identifying binders within the services layer that are compatible with the output data format and communication protocol of the sensor. This step also includes, at the services layer, assigning a unique identifier to the sensor. At step 46, the method then includes applying, within the middleware layer, a domain and a topic associated with the data output of the sensor and subscribing the sensor to any topics, as appropriate. The method then includes configuring data formats at the display layer, including how the data is to be presented on any human-machine-interfaces. At step 48, the method includes establishing a quality of service (QOS) and publishing sensor data in the middleware layer using the aforementioned publish-subscribe distribution model. Examples include Data Distribution Service (DDS) middleware, however other publish-subscribe distribution models can be used in other embodiments. Publishing the sensor data allows other devices and systems within the vehicle network to subscribe to the sensor data and receive real-time updates. With respect to QoS, the middleware layer provides bandwidth allocation, latency control, packet loss prevention, prioritization, and traffic shaping and policing. At step 50, the connected device 40 is deployed. This step includes presenting the sensor data in the OSA's display layer. This step may involve configuring a graphical user interface (e.g., touchscreen display) or dashboard that can display the sensor data in a meaningful way.

To reiterate, the OSA of the present invention allows for the rapid integration of new connected devices to an existing vehicle network, enabling real-time data exchange among connected devices and potentially enhancing situational awareness, survivability, and lethality of the host vehicle. The OSA of the present invention also provides low latency communications for connected devices, is input/output (I/O) agnostic, and includes low system usage for message distribution among relevant systems. While primarily described above in connection with ground based systems, for example tracked and wheeled vehicles, the OSA of the present invention is uniquely suited for a wide range of crewed and autonomous vehicles, both military and non-military, including airborne platforms and maritime (surface and sub-surface) platforms.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A system comprising:
   a plurality of connected devices coupled to at least one node of a vehicle network, the vehicle network including a services layer, a middleware layer, and a display layer, the plurality of connected devices outputting data messages in accordance with one of a plurality of different data formats and one of a plurality of different interface standards;
   wherein the services layer collects and prioritizes each data message from the plurality of connected devices and assigns a unique identifier to each of the plurality of connected devices, the services layer including a plurality of binders that are compatible with each of the plurality of different data formats and each of the plurality of different interface standards;
   wherein the middleware layer manages a flow of the data messages from each of the plurality of connected devices to the display layer according to a publish-subscribe distribution model and based on the prioritization of the data messages at the services layer, such that time-critical data messages are distributed to the display layer ahead of less time-critical data messages, and wherein the middleware layer applies a domain and a topic to each data message for distribution to the display layer; and
   wherein the display layer manages the display of data from each of the plurality of connected devices at one or more human-machine-interfaces and accepts a plurality of control inputs from the one or more human-machine interfaces.

2. The system of claim 1, wherein the plurality of connected devices are coupled to the services layer via an Ethernet connection or shared memory.

3. The system of claim 1, wherein the services layer is configured to accept data from each of the plurality of connected devices in a native format.

4. The system of claim 1, wherein at least one of the plurality of connected devices is both of a publisher and a subscriber according to the publish-subscribe distribution model.

5. The system of claim 1, wherein the display layer is configured to superimpose data from at least one of the plurality of connected devices over a video feed.

6. The system of claim 1, wherein the display layer is configured to superimpose data from at least one of the plurality of connected devices over a digital map display.

7. The system of claim 1, wherein each of the plurality of connected devices is configured to transmit, access, and receive a signal from the services layer.

8. The system of claim 1, wherein each of the plurality of connected devices is coupled to the services layer over a shared common bus.

9. A method of controlling an information exchange between a plurality of connected devices that are coupled to a vehicle network, the method comprising:

collecting data messages from each of the plurality of connected devices through a services layer of an open systems architecture, wherein each of the plurality of connected devices outputs data messages in accordance with one of a plurality of different data formats and one of a plurality of different interface standards;

assigning, at the services layer, a unique identifier to each of the plurality of connected devices and prioritizing each data message as generated by each of the plurality of connected devices, the services layer including a plurality of binders that are compatible with each of the plurality of different data formats and each of the plurality of different interface standards;

periodically publishing, by a middleware layer of the open systems architecture, the data messages from a first one of the plurality of connected devices to a second one of the plurality of connected devices pursuant to a publish-subscribe distribution model and based on the prioritization of the data at the services layer, such that time-critical data messages are distributed to the display layer ahead of less time-critical data messages, wherein periodically publishing the data messages generated by the first one of the plurality of connected devices includes applying a domain and a topic to each data message, and selecting a subscriber node and a refresh rate for publication; and generating, by a display layer of the open systems architecture, information derived from the data messages generated by at least one of the plurality of connected devices at a human-machine-interface that is coupled to the vehicle network and accepting a plurality of control inputs from the human-machine interface.

10. The method of claim 9, wherein periodically publishing the data includes providing push updates to the selected subscriber node at the selected refresh rate.

11. The method of claim 9, wherein collecting the data includes accepting and processing the data in a format that is native to at least one of the plurality of connected devices.

12. The method of claim 9, wherein generating a display of the data includes superimposing the data onto a video feed.

13. The method of claim 9, wherein generating a display of the data includes superimposing the data onto a digital map display.

14. The method of claim 9, further including updating the selecting refresh rate based on a change in a usage demand of the data generated by the plurality of connected devices.

15. The method of claim 9, wherein publishing the data is performed without regard for which of the plurality of connected devices generated the data.

16. The method of claim 9, wherein assigning a unique identifier and prioritizing data is performed prior to publication of the data by the middleware layer.

17. The method of claim 9, further including reducing network traffic on the vehicle network by preventing publication of the data to other than the subscriber node.

18. The method of claim 9, wherein the vehicle network comprises one or more buses that are in electronic communication with the services layer of the open systems architecture.

\* \* \* \* \*